(12) United States Patent
Gannon

(10) Patent No.: US 7,180,250 B1
(45) Date of Patent: Feb. 20, 2007

(54) TRIAC-BASED, LOW VOLTAGE AC DIMMER

(76) Inventor: Henry Michael Gannon, 510 Fruitvale Ct., #B, Grand Junction, CO (US) 81504

( * ) Notice: Subject to any disclaimer, the term of this patent is extended or adjusted under 35 U.S.C. 154(b) by 0 days.

(21) Appl. No.: 11/043,298

(22) Filed: Jan. 25, 2005

(51) Int. Cl.
*H05B 41/16* (2006.01)
*H05B 37/02* (2006.01)

(52) U.S. Cl. .................. 315/276; 315/299; 315/362
(58) Field of Classification Search ............. 315/246, 315/276, 283, 291, 307, 279, 299, 362, DIG. 4; 307/134, 139, 140, 141
See application file for complete search history.

(56) References Cited

U.S. PATENT DOCUMENTS

| | | | | |
|---|---|---|---|---|
| 3,763,396 A | * | 10/1973 | Shilling | 315/307 |
| 3,821,634 A | * | 6/1974 | Sabolic | 323/321 |
| 4,271,386 A | * | 6/1981 | Lee | 318/729 |
| 4,323,835 A | * | 4/1982 | Lee | 318/729 |
| 4,891,562 A | * | 1/1990 | Nuckolls et al. | 315/277 |
| 2003/0161164 A1 | * | 8/2003 | Shannon et al. | 363/40 |

* cited by examiner

*Primary Examiner*—Thuy Vinh Tran

(57) ABSTRACT

A two-wire triac-based low voltage AC dimmer adapted for configuration in series with a typically incandescent lighting load. An external step-down transformer provides a source of low AC voltage, and a separate, electrically isoated loop circuit utilizing a step-up transformer converts a portion of the low AC voltage into a corresponding high AC voltage used to trigger the gate of a triac. An on/off arrangement that serves to lock the triac in its blocking may optionally be provided. A shunting resistor connected across the triac serves to dissipate static charge buildup that may otherwise falsely trigger the triac to its on state. A phi filter provides a smoother and more regulated triggering pulse to the triac, thereby minimizing or eliminating flickering and undesirable extinguishing of the incandescent lighting load at low brightness settings.

16 Claims, 2 Drawing Sheets

TRIAC-BASED, LOW VOLTAGE AC DIMMER

FIELD OF THE INVENTION

The present invention relates generally to AC dimmers and, more particularly, to a triac-based low voltage dimmer for use in outdoor applications such as architectural lighting and swimming pool lighting, for example.

BACKGROUND AND SUMMARY OF THE INVENTION

Dimmers of various types are well known in the prior art. Mechanical rheostats must dissipate considerable wasted energy in the form of heat and must be closely coordinated in resistive value with the load being controlled in order to achieve optimal dimming effect. SCR dimmers are disadvantageous in that two devices in combination with an elaborate triggering arrangement are required in full wave AC applications. The triac has been the device of choice in prior art line voltage AC dimmers due to its inherently high efficiency and load independence. Since triacs require a relatively high trigger voltage on the order of 35 volts, their prior art usage has been largely limited to line voltage AC applications. The primary advantage of these prior art triac-based line voltage AC dimmers is that they may be easily configured in series with an incandescent lighting load as a complete controller and load circuit. In this configuration, the dimmer derives operating power via loop interaction with the load it controls to thereby achieve the same two-wire hookup as a toggle switch, which it often directly replaces. Its high efficiency and minimal heat dissipation facilitate installation in a confined space, such as a wall electrical box that may be conveniently accessed. The principal disadvantage of prior art triac-based line voltage AC dimmers is the generation of a relatively high level of undesirable radio frequency noise that results from the inherently rapid switching time of the triac. Since triggering of these prior art dimming circuits does not occur until the AC voltage reaches at least 35 volts, it is only possible to achieve a maximum brightness level of about 90% of an incandescent lighting load, as compared to about 95% in the case of an SCR-based dimmer and 100% when employing a direct switching device. Yet another disadvantage of triac-based line voltage AC dimmers is the potential for light flickering and unwanted extinguishing of the incandescent lighting load at or near the maximum dimming level.

Low voltage AC lighting systems are often preferred over line voltage AC lighting systems in the interest of increased safety, for example, in outdoor installations such as architectural lighting or swimming pool lighting. Another reason for using low voltage AC lighting is to take advantage of the superior color rendering characteristics, longer rated bulb life, and superior light beam concentration attributed to low voltage AC incandescent lighting. Although AC line voltage is generally considered safe in outdoor applications when proper wiring procedures are followed and a safety device such as an isolation transformer and/or ground fault interrupter is added, voltage levels below 50 volts are considered non-shocking and are therefore often preferred in wet environments to eliminate even the slightest possibility of electrical shock.

A standard step-down transformer in a protected location is typically used to reduce AC line voltage to 12 or 24 volts in order to power any of a variety of standard low voltage lighting fixtures in one or more unprotected locations. A major drawback of low voltage AC lighting as compared with line voltage lighting is that it requires proportionally more current to obtain the same level of illumination, thereby placing an increased strain on current-carrying components. For example, in a 12-volt AC system, a maximum of only about 100 watts of power can be delivered through a 16-gauge conductor while staying within the electrical wiring code.

Dimming of low voltage AC incandescent lighting is often desired, for example, to achieve a more dramatic effect from a particular architectural lighting scheme. One prior art approach for dimming low voltage AC incandescent lighting combines a line-voltage AC dimmer driving the primary side of a transformer with one or more low voltage incandescent bulbs dimmed from the secondary. However, a triac-based line voltage AC dimmer is an acknowledged poor device for driving the inductive load presented by the primary side of a transformer because the inherent fast switching time of the triac induces relatively high amplitude voltage spikes and current surges. Some combination of dimmer buzz, fixture buzz, lamp flickering, interaction between circuits, radio frequency interference, and possible damage to the dimmer is the frequent result of such an arrangement.

Another prior art low voltage AC dimmer is designed for driving the line side of a transformer, which may incorporate a third wire bypass to decouple spikes and surges as well as a shutdown arrangement in the event of overheating, which may be caused by losing the secondary load, for example. In order to assure proper operation and matching of components, a packaged system that includes transformer, fixture, dimmer, and bulbs is usually offered. Such packaged systems are disadvantageous in that the light bulbs are not individually dimmable, and the combination is nowhere near as adaptable to specific user needs as may be possible through the use of separate components.

Yet another prior art approach for dimming low voltage AC incandescent lighting is to first convert the low voltage AC waveform into a pulsing DC waveform using a standard rectifier, and then apply the resulting waveform to any DC dimmer known in the art. However, this method is suboptimal in that at low voltages, a standard rectifier dissipates a sizable percentage of the total incoming power as heat (about 10 percent at 12 volts AC) even before dimming is applied, thereby limiting siting options and achievable power delivery levels. A stand-alone, ventilated circuit box might allow power delivery beyond the 100-watt range, although the increased cost would probably limit use of this arrangement to specialty applications. This prior art approach is further disadvantageous in that filtering of the pulsing DC waveform may be required for proper operation of the dimmer, and two-wire implementation of the dimmer is unlikely.

It would therefore be advantageous to provide a two-wire triac-based low voltage AC dimmer adapted for configuration in series with a typically incandescent lighting load. In accordance with the illustrated preferred embodiment of the present invention, a step-down transformer provides a low voltage AC waveform, and a separate, electrically isoated loop circuit utilizing a step-up transformer converts a portion of the low voltage AC waveform into a corresponding high voltage AC waveform used to trigger the gate of a triac by means of any of a number of well known phase delay or special effects circuits. The remaining portion of the low voltage AC waveform is selectively gated without conversion through the power terminals of the triac to achieve variable power delivery to the incandescent load. An on/off arrangement that serves to lock the triac in its blocking state may be incorporated in the present low voltage AC dimmer. The present low voltage AC dimmer permits the use of a less expensive and more effective radio frequency filter capacitor.

DETAILED DESCRIPTION OF THE PREFERRED EMBODIMENT

Figure 2:
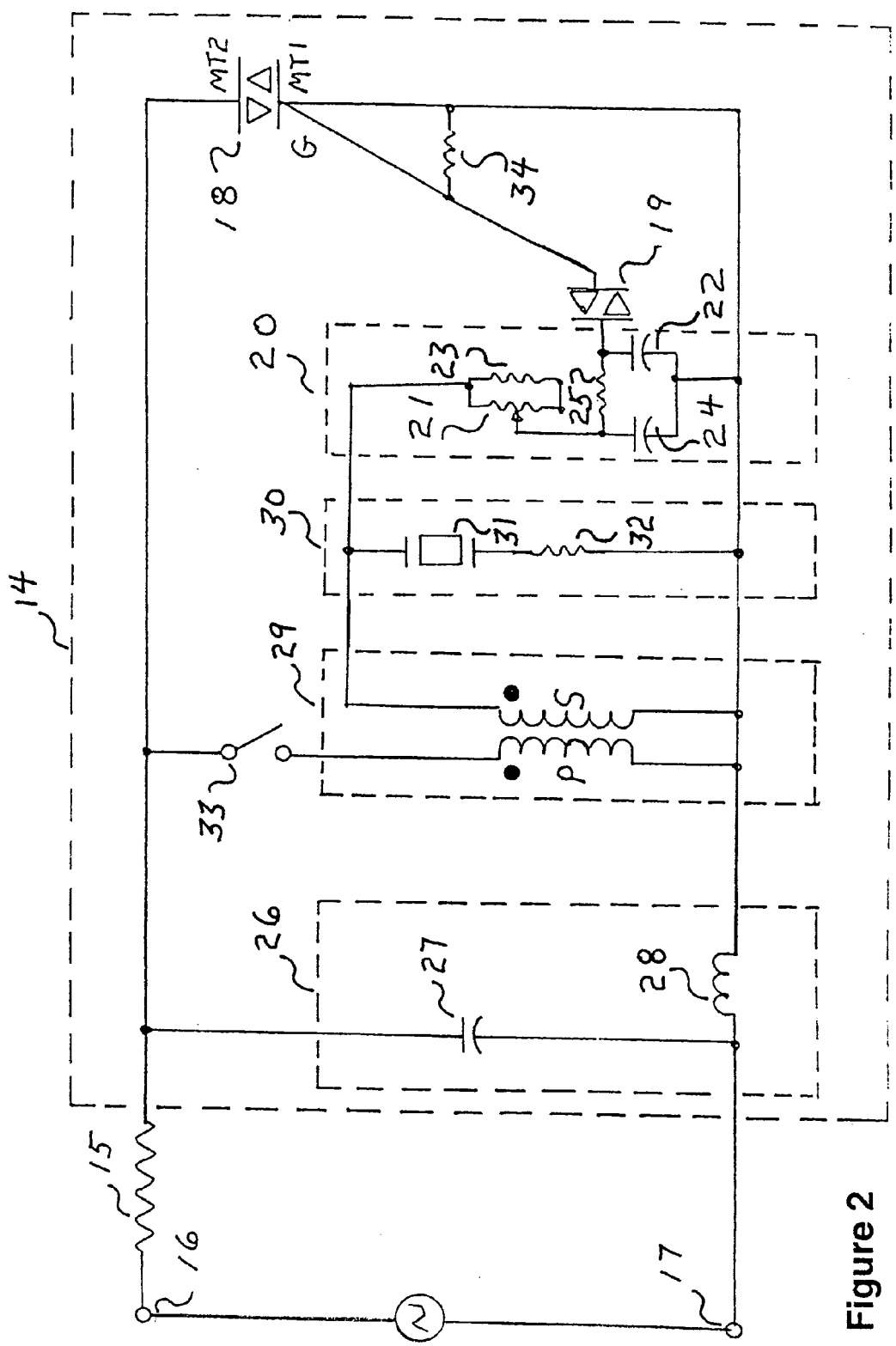
FIG. 2 is a shcematic diagram of a low voltage AC dimmer circuit in accordance with the present invention.

FIG. 2 shows a triac-based, low-voltage AC dimmer circuit 14 constructed in accordance with the present invention. Dimmer circuit 14 is configured in series with an incandescent lighting load 15 as a complete controller and load circuit. An external source of low-voltage AC, typically provided at the secondary winding of a standard step-down transformer, is applied to the circuit across input terminals 16 and 17. All component values stated hereinafter are nominal and approximate.

Figure 1:
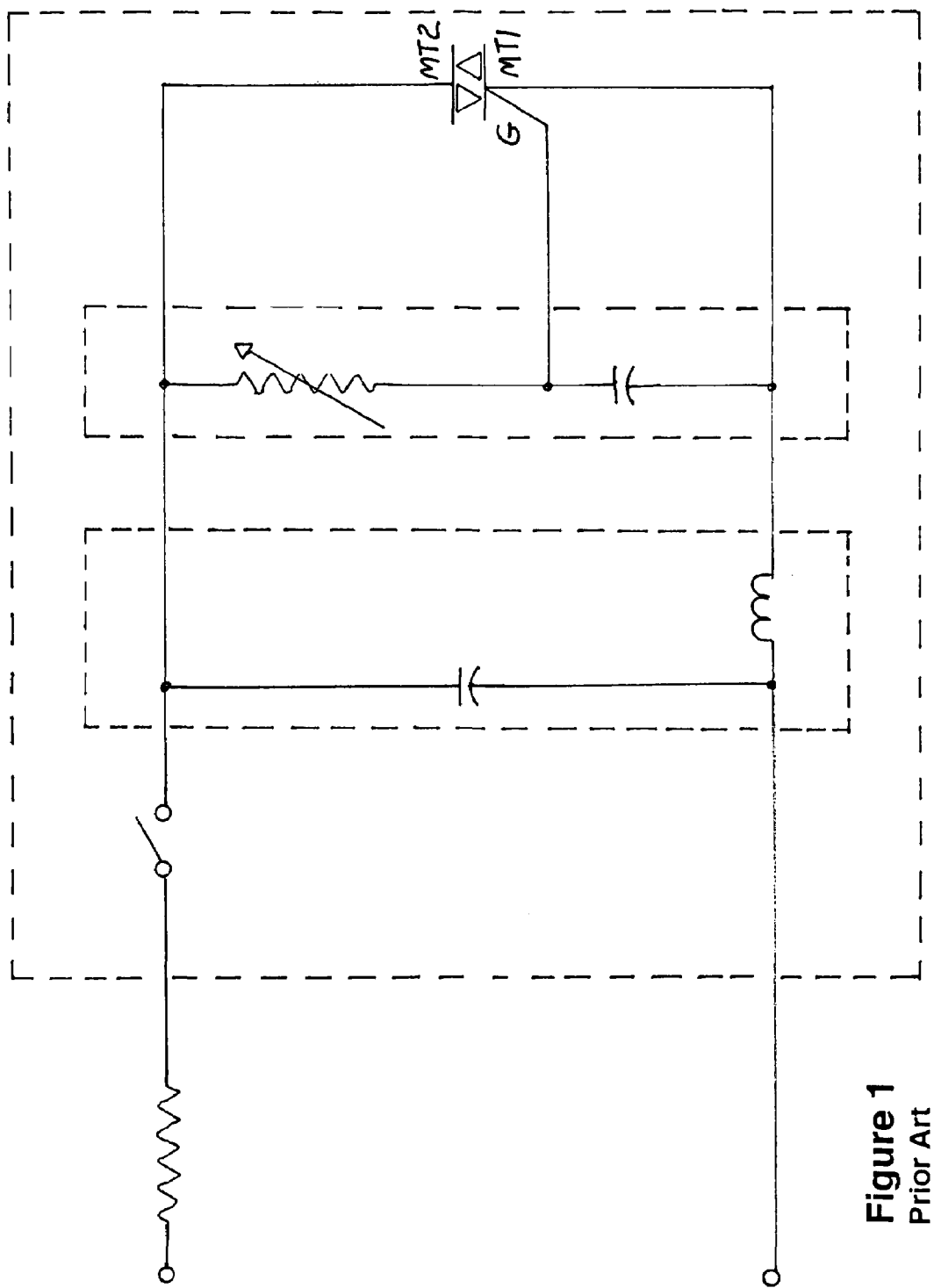
FIG. 1 is a schematic diagram of a prior art line voltage AC dimmer circuit.

A triac 18 may comprise any commercially available triac device. Triggering for the on or conductive state is achieved by applying a threshold voltage of either polarity across gate G and the MT1 power terminal, as low-voltage is concurrently applied across the MT1 and MT2 power terminals. Once triggered, current flows through the MT1 and MT2 power terminals to energize incandescent load 15. Triac 18 reverts to its off or blocking state whenever the voltage across the MT1 and MT2 power terminals decreases to zero, or the current flow through the MT1 and MT2 power terminals decreases below a minimum value. A diac 19 serves the same enhancement function for triggering of triac 18 as the diac in the prior art circuit of FIG. 1.

A phase delay or other adjustable trigger control circuit 20, that may consist of the illustrated series combination of an adjustment potentiometer 21 and a timing capacitor 22, is operative to trigger triac 18 into conduction anywhere from early in the half cycle for maximum brightness of incandescent load 15, to later in the half cycle for dimming effect. A shunting resistor 23, selected to optimize the resistive value of adjustment potentiometer 21 in relation to timing capacitor 22, may be optionally included. For example, in the illustrated embodiment of FIG. 2, a 150K ohm discrete resistor shunting a "too high" 100K ohm potentiometer 21 results in the "just right" combination value of 60K ohms. Also, the parallel combination is likely to be within a closer resistive tolerance in a production environment, the tolerance of a standard discrete resistor is typically plus or minus five percent of its nominal value, while the tolerance of a standard potentiometer (maximum resistance) is only plus-or-minus ten percent of its nominal value.

Moreover, the somewhat sagging response curve that results from the parallel combination of shunting resistor 23 and adjustment potentiometer 21 provides improved power control at low brightness settings (i.e., more knob rotation vs. brightness response in this range), as preferred by many users.

Timing capacitor 22, which stores a combination of voltage and current to power each trigger pulse, shunts gate G and the MT1 power terminal of triac 18, with gate polarity referenced to the MT1 power terminal. In the preferred embodiment of FIG. 2, auxiliary timing capacitor 24, connected to timing capacitor 22 with bridging resistor 25 to form a familiar phi filter, can optionally be included to provide a smoother and more regulated triggering pulse to triac 18, thereby minimizing or eliminating flickering and unwanted extinguishing of incandescent load 15 at low brightness settings. Bridging resistor 25 slightly reduces the maximum brightness level that can be achieved by perhaps one percent, though the tradeoff does not impact efficiency and is worthwhile in most applications.

Other components and configurations known in the art to improve the performance of phase delay circuit 20 or provide a special effect may be added or substituted, as the user chooses.

An RF filter circuit 26 consists of the combination of capacitor 27 and choke coil 28, configured as an LC filter. Because only low voltage AC is processed by RF filter circuit 26, capacitor 27 can be of a higher value than its line voltage AC counterpart for equal cost and size, thereby potentially improving RF noise attenuation. For example, a 2.2 microfarad, 50-volt ceramic capacitor may be used at the same cost as a larger and more expensive 0.47 microfarad, 250-volt mylar capacitor. Choke coil 25 is probably the same as or similar to that of its line voltage AC counterpart when configured for equal current delivery. Incandescent lighting load 15 may be positioned in either or both legs of triac-based, line-voltage ac dimmer 14, as may choke coil 28 of filter circuit 26.

A step-up transformer 29, representing a very important component of the dimmer circuit of the present invention, receives a portion of the low voltage AC waveform present at terminals 16 and 17, and converts it into a corresponding high voltage AC waveform of the same polarity serving to trigger gate G of triac 18 through phase delay circuit 20. A sub-miniature variety of transformer 29, little more than an inch square and delivering a maximum of perhaps 0.5 VA of power suffices, as power can be slowly stored in timing capacitor 22 and then rapidly released at the required instant. To avoid use of a costly custom transformer, the primary and secondary windings of a standard off-the-shelf step-down transformer may be conveniently swapped.

Because of the electrical isolation between the primary winding P and the secondary winding S of transformer 29, because the secondary winding forms a closed loop through phase delay circuit 20, and because the secondary winding has an internal resistance in the range of several thousand ohms, no risk of dangerous electrical shock is presented to the user.

The low voltage AC waveform is normally stepped up to in-phase AC line voltage, though it may be stepped up to a higher voltage so as to more rapidly reach the threshold voltage at which triac 18 fires along the half cycle to achieve a higher maximum load brightness. For example, rather than the 1:10 primary-to-secondary winding ratio used to convert a 12-volt AC waveform to a 120-volt AC waveform, a 1:20 winding ratio for a 240-volt AC step-up may be substituted. This latter combination results in about three percent improved maximum load brightness to more favorably compete with SCR-based circuitry and direct switching in this regard. Alternatively, stepping up to a voltage that is less than AC line voltage may be employed if desired.

An AC voltage regulating circuit 30, consisting of a bidirectional transient voltage suppressor 31 and a discrete resistor 32, may optionally be included to compensate for variations in low-voltage AC input across terminals 15 and 16, variations in component values, etc. that can degrade performance of low-voltage AC dimmer circuit 14, particularly over the important maximum dimming range. In operation, bidirectional transient voltage suppressor 31 fires at perhaps ⅔ of expected half-cycle peak value, thereby shunting resistor 32 across the secondary of step-up transformer 29 to clip or significantly suppress the remainder of the waveform for regulation effect. Because of the high internal resistance of transformer 29, only a small fraction of a watt of power is traded off for a significant improvement in stability. Resistor 32 may be a relatively low value to deliver an approximately trapezoidal waveform, or in some cases may even eliminated entirely.

A switch 33 may optionally be provided, as illustrated in FIG. 2, to lock triac 18 in its off or blocking state. When switch 33 is closed, the primary winding of transformer 29 is connected to the low-voltage AC source, and the dimmer circuit 14 functions as described above. When switch 33 is open, the primary winding of transformer 29 is disconnected from the low-voltage AC power source, depriving gate G of triac 18 of the high-voltage required for triggering, and creating a conductive pathway through adjustment potentiometer 21 and the now inactive secondary winding of transformer 29. This conductive pathway serves to dissipate static charge that might otherwise accumulate and falsely trigger triac 18 to its conductive state. Because only a relatively few milliamperes of current are carried by switch 33 of the present dimmer circuit rather than the entire load current, a higher value of load current, physically smaller circuit size, lower cost, and longer component life are possible, all critical parameters for some applications.

Optionally, a discrete resistor 34, of high value, may be connected directly across gate G and the MT1 power terminal of triac 18 to further dissipate static charge that might otherwise accumulate and falsely trigger triac 18.

In operation, beginning with a positive-going, low voltage half cycle applied across input terminals 16 and 17 and triac 18 initially in its off state, the low voltage half cycle builds across the MT1 and MT2 power terminals of triac 18, while a corresponding high voltage half cycle of the same polarity generated by step-up transformer 29 concurrently builds across timing capacitor 22 through the resistance of adjustment potentiometer 21. Incandescent lighting load 15 acts as a conductor for a minute amount of current during this interval. The time required for the voltage across timing capacitor 22 to reach the 35 volts required to trigger gate G of triac 18 is a function of the resistance setting of adjustment potentiometer 21.

With adjustment potentiometer 21 first set for zero resistance, the instantaneous value of the high-voltage half cycle waveform and the voltage across timing capacitor 22 are essentially the same, and triac 18 fires immediately as 35 volts is reached. When triac 18 fires, the voltage drop across dimmer 14 drops to a low value as current stored in timing capacitor 22 discharges through gate G of triac 18 to ensure lock-on. Triac 18 remains in its on state for the remainder of the low voltage half cycle, resulting in maximum brightness of incandescent lighting load 15. Triac 18 reverts to its off state as the instantaneous value of the positive-going, low voltage half cycle across the MT1 and MT2 power terminals of triac 18 crosses zero and the negative-going low voltage half cycle begins, to be processed in a similar way, though in opposite polarity, as previously described. Again, a positive pulse triggers a positive half cycle, and a negative trigger pulse triggers a negative half cycle.

With adjustment potentiometer 21 next set for maximum resistance, the rise of voltage across timing capacitor 22 is correspondingly delayed, resulting in triac 18 firing correspondingly later along the high voltage half cycle and a correspondingly lesser portion of the low voltage half cycle dissipating across incandescent lighting load 15 for the desired dimming effect. An infinite range of intermediate power levels is possible depending on the resistance setting of adjustment potentiometer 21.

Optionally, transformer 29 may be replaced by a discrete resistor connected to a source of line voltage AC to enable the remaining circuitry illustrated in FIG. 2 to function as a triac-based line voltage AC dimmer.

I claim:

1. A low voltage dimmer circuit, comprising:
   a lighting load to be controlled;
   a source of low AC voltage for powering the lighting load;
   a step-up transformer connected to said source of low AC voltage for converting said low AC voltage to a higher AC voltage;
   a triac coupled in series with the lighting load;
   adjustable trigger control circuit means coupled to said step-up transformer and to said triac for triggering said triac into a conduction state to thereby provide adjustable control of a portion of said source of low AC voltage applied to said lighting load; and
   an AC voltage regulator coupled across a secondary winding of said step-up transformer, said AC voltage regulator comprising a bi-directional transient suppressor in series with a resistor.

2. A low voltage AC dimmer circuit as in claim 1, wherein said lighting load comprises an incandescent lighting load.

3. A low voltage AC dimmer circuit as in claim 1, wherein said higher AC voltage comprises AC line voltage.

4. A low voltage AC dimmer circuit, comprising:
   a lighting load to be controlled;
   a source of low AC voltage for powering the lighting load;
   a step-up transformer connected to said source of low AC voltage for converting said low AC voltage to a higher AC voltage, said step-up transformer comprising a primary winding connected to said source of low AC voltage and a secondary winding for supplying said higher AC voltage;
   a triac coupled in series with the lighting load;
   adjustable trigger control circuit means coupled to said step-up transformer and to said triac for triggering said triac into a conduction state to thereby provide adjustable control of a portion of said source of low AC voltage applied to said lighting load; and
   switch means connected in series with said primary winding of said step-up transformer for switching said AC dimmer circuit between a normal state of operation and an off state of operation, said triac being locked in a blocking state during said off state of operation of said AC dimmer circuit.

5. A low voltage AC dimmer circuit as in claim 4, wherein said adjustable trigger control circuit means is coupled across said secondary winding of said step-up transformer.

6. A low voltage AC dimmer circuit as in claim 4, further comprising an LC filter coupled to said primary winding of said step-up transformer to provide radio frequency noise attenuation.

7. A low voltage AC dimmer circuit as in claim 4, wherein said lighting load comprises an incandescent lighting load.

8. A low voltage AC dimmer circuit as in claim 4, wherein said higher AC voltage comprises AC line voltage.

9. A low voltage AC dimmer circuit, comprising:
   a lighting load to be controlled;
   a source of low AC voltage for powering the lighting load;
   a step-up transformer connected to said source of low AC voltage for converting said low AC voltage to a higher AC voltage, said step-up transformer comprising a primary winding connected to said source of low AC voltage and a secondary winding for supplying said higher AC voltage;

a triac coupled in series with the lighting load; and adjustable trigger control circuit means coupled to said step-up transformer and to said triac for triggering said triac into a conduction state to thereby provide adjustable control of a portion of said source of low AC voltage applied to said lighting load, said adjustable trigger control circuit means comprising a series combination of a potentiometer and a timing capacitor coupled across said secondary winding of said step-up transformer.

10. A low voltage AC dimmer circuit as in claim 9, wherein said adjustable trigger control circuit means further comprises:

a fixed resistor shunted across said potentiometer; and a series combination of an auxiliary timing capacitor and a bridge resistor coupled across said timing capacitor.

11. A low voltage AC dimmer circuit as in claim 9, wherein said lighting load comprises an incandescent lighting load.

12. A low voltage AC dimmer circuit as in claim 9, wherein said higher AC voltage comprises AC line voltage.

13. A low voltage AC dimmer circuit, comprising:

a low voltage lighting load to be controlled;

a source of low AC voltage for powering the low voltage lighting load;

a step-up transformer connected to said source of low AC voltage for converting said low AC voltage to a higher AC voltage;

a triac coupled in series with the low voltage lighting load; and adjustable trigger control circuit means coupled to said step-up transformer and to said triac said adjustable trigger control circuit means being arranged for receiving said higher AC voltage and for triggering said triac into a conduction state to thereby provide adjustable control of a portion of said source of low AC voltage applied to said low voltage lighting load, said adjustable trigger control circuit means comprising a phase delay circuit.

14. A low voltage AC dimmer circuit as in claim 13, wherein said low voltage lighting load comprises an incandescent low voltage lighting load.

15. A low voltage AC dimmer circuit as in claim 13, wherein said higher AC voltage comprises AC line voltage.

16. A low voltage dimmer circuit, comprising:

a lighting load to be controlled;

a source of low AC voltage for powering the lighting load;

a step-up transformer connected to said source of low AC voltage for converting said low AC voltage to a higher AC voltage;

a triac coupled in series with the lighting load;

adjustable trigger control circuit means coupled to said step-up transformer and to said triac for triggering said triac into a conduction state to thereby provide adjustable control of a portion of said source of low AC voltage applied to said lighting load; and an AC voltage regulator coupled across a secondary winding of said step-up transformer, said AC voltage regulator comprising a bi-directional transient suppressor.

* * * * *